(12) United States Patent
Alvarez

(10) Patent No.: US 9,507,814 B2
(45) Date of Patent: Nov. 29, 2016

(54) BIT LEVEL COMPARATOR SYSTEMS AND METHODS

(71) Applicant: Vertafore, Inc., Bothell, WA (US)

(72) Inventor: Raul Alvarez, Bothell, WA (US)

(73) Assignee: Vertafore, Inc., Bothell, WA (US)

(*) Notice: Subject to any disclaimer, the term of this patent is extended or adjusted under 35 U.S.C. 154(b) by 192 days.

(21) Appl. No.: 14/101,905

(22) Filed: Dec. 10, 2013

(65) Prior Publication Data

US 2015/0161121 A1 Jun. 11, 2015

(51) Int. Cl.
G06F 7/00 (2006.01)
G06F 17/30 (2006.01)

(52) U.S. Cl.
CPC ..... G06F 17/3033 (2013.01); G06F 17/30067 (2013.01)

(58) Field of Classification Search
CPC .................. G06F 17/3033; G06F 17/30067; G06F 17/30017; G06F 17/30286
See application file for complete search history.

(56) References Cited

U.S. PATENT DOCUMENTS

| | | |
|---|---|---|
| 3,970,992 A | 7/1976 | Boothroyd et al. |
| 4,346,442 A | 8/1982 | Musmanno |
| 4,347,568 A | 8/1982 | Giguere et al. |
| 4,359,631 A | 11/1982 | Lockwood et al. |
| 4,383,298 A | 5/1983 | Huff et al. |
| 4,410,940 A | 10/1983 | Carlson et al. |
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

Sinyagin et al., "Integration Testing Method and System for Web Services," U.S. Appl. No. 14/104,749, filed Dec. 12, 2013, 63 pages.

(Continued)

*Primary Examiner* — Daniel Kuddus
(74) *Attorney, Agent, or Firm* — Seed IP Law Group LLP

(57) ABSTRACT

A bit level file comparison system compares two file systems, each of which includes any number of individual files, to determine whether the file systems are identical at a bit level. A hashing function is applied to each file in the first file system to generate a hash value that is logically associated with the respective file in the first file system. The hashing function is applied to each file in the second file system to generate a hash value that is logically associated with the respective file in the second file system. The hash value associated with a file in the first file system is compared with the hash value associated with the corresponding file in the second file system to determine whether bit level differences between the respective file in the first file system and the second file system.

21 Claims, 7 Drawing Sheets

(56) References Cited

U.S. PATENT DOCUMENTS

| | | |
|---|---|---|
| 4,642,768 A | 2/1987 | Roberts |
| 4,646,229 A | 2/1987 | Boyle |
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 | 5/2001 | Immon et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,393,438 B1 * | 5/2002 | Kathrow ............ G06F 9/44505 705/54 |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,000,230 B1 * | 2/2006 | Murray ................. G06F 8/61 717/170 |
| 7,010,503 B1 | 3/2006 | Oliver et al. |
| 7,020,779 B1 | 3/2006 | Sutherland |
| 7,028,223 B1 | 4/2006 | Kolawa et al. |
| 7,146,495 B2 | 12/2006 | Baldwin et al. |
| 7,178,110 B2 | 2/2007 | Fujino |
| 7,191,195 B2 | 3/2007 | Koyama et al. |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,478,064 B1 | 1/2009 | Nacht |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,711,703 B2 | 5/2010 | Smolen et al. |
| 7,725,456 B2 | 5/2010 | Augustine |
| 7,757,168 B1 | 7/2010 | Shanahan et al. |
| 7,814,078 B1 * | 10/2010 | Forman ............ G06F 17/30486 707/698 |
| 7,886,046 B1 | 2/2011 | Zeitoun et al. |
| 7,930,757 B2 | 4/2011 | Shapiro et al. |
| 7,949,711 B2 | 5/2011 | Chang et al. |
| 7,996,759 B2 | 8/2011 | Elkady |
| 8,140,589 B2 | 3/2012 | Petri |
| 8,146,058 B2 | 3/2012 | Sarkar et al. |
| 8,166,388 B2 | 4/2012 | Gounares et al. |
| 8,171,404 B2 | 5/2012 | Borchers et al. |
| 8,234,219 B2 | 7/2012 | Gorczowski et al. |
| 8,266,592 B2 | 9/2012 | Beto et al. |
| 8,285,685 B2 | 10/2012 | Prahlad et al. |
| 8,290,971 B2 | 10/2012 | Klawitter et al. |
| 8,321,483 B2 | 11/2012 | Serlet et al. |
| 8,370,403 B2 | 2/2013 | Matsuki |
| 8,438,045 B2 | 5/2013 | Erlanger |
| 8,458,582 B2 | 6/2013 | Rogers et al. |
| 8,650,043 B1 | 2/2014 | Phillips |
| 8,667,267 B1 * | 3/2014 | Garcia ................ H04L 63/0869 380/202 |
| 8,725,682 B2 * | 5/2014 | Young ................ G06F 17/30017 707/610 |
| 8,825,626 B1 * | 9/2014 | Wallace ............ G06F 17/30994 707/697 |
| 8,832,045 B2 * | 9/2014 | Dodd ................ G06F 17/30073 707/693 |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0087602 A1 | 7/2002 | Masuda et al. |
| 2002/0120474 A1 | 8/2002 | Hele et al. |
| 2002/0120776 A1 | 8/2002 | Eggebraaten et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059592 A1 | 3/2004 | Yadav-Ranjan |

(56) References Cited

U.S. PATENT DOCUMENTS

| | | |
|---|---|---|
| 2004/0059740 A1 | 3/2004 | Hanakawa et al. |
| 2004/0128182 A1 | 7/2004 | Pepoon et al. |
| 2004/0133606 A1 | 7/2004 | Miloushev et al. |
| 2004/0186750 A1 | 9/2004 | Surbey et al. |
| 2004/0193455 A1 | 9/2004 | Kellington |
| 2004/0194026 A1 | 9/2004 | Barrus et al. |
| 2004/0220975 A1* | 11/2004 | Carpentier ........ G06F 17/30097 |
| 2004/0230903 A1 | 11/2004 | Elza et al. |
| 2004/0236614 A1 | 11/2004 | Keith |
| 2004/0243969 A1 | 12/2004 | Kamery et al. |
| 2004/0255275 A1 | 12/2004 | Czerwonka |
| 2004/0267578 A1 | 12/2004 | Pearson |
| 2005/0024387 A1 | 2/2005 | Ratnakar et al. |
| 2005/0033988 A1* | 2/2005 | Chandrashekhar . H04L 63/0435 |
| | | 726/4 |
| 2005/0071203 A1 | 3/2005 | Maus |
| 2005/0080804 A1 | 4/2005 | Bradshaw, Jr. et al. |
| 2005/0137928 A1 | 6/2005 | Scholl et al. |
| 2005/0144195 A1 | 6/2005 | Hesselink et al. |
| 2005/0233287 A1 | 10/2005 | Bulatov et al. |
| 2006/0047540 A1 | 3/2006 | Hutten et al. |
| 2006/0059338 A1* | 3/2006 | Feinleib ................ G06F 21/121 |
| | | 713/165 |
| 2006/0100912 A1 | 5/2006 | Kumar et al. |
| 2006/0184452 A1 | 8/2006 | Barnes et al. |
| 2006/0195491 A1 | 8/2006 | Nieland et al. |
| 2006/0195494 A1 | 8/2006 | Dietrich |
| 2006/0259524 A1 | 11/2006 | Horton |
| 2007/0006222 A1 | 1/2007 | Maier et al. |
| 2007/0016465 A1 | 1/2007 | Schaad |
| 2007/0016829 A1 | 1/2007 | Subramanian et al. |
| 2007/0061154 A1 | 3/2007 | Markvoort et al. |
| 2007/0067772 A1 | 3/2007 | Bustamante |
| 2007/0160070 A1 | 7/2007 | Buchhop et al. |
| 2007/0186066 A1* | 8/2007 | Desai .................. G06F 11/1448 |
| | | 711/162 |
| 2007/0186085 A1* | 8/2007 | Yim ..................... H03K 19/177 |
| | | 712/244 |
| 2007/0186214 A1 | 8/2007 | Morgan |
| 2007/0244921 A1 | 10/2007 | Blair |
| 2007/0244935 A1 | 10/2007 | Cherkasov |
| 2007/0245230 A1 | 10/2007 | Cherkasov |
| 2007/0282927 A1 | 12/2007 | Polouetkov |
| 2008/0002830 A1 | 1/2008 | Cherkasov et al. |
| 2008/0010542 A1 | 1/2008 | Yamamoto et al. |
| 2008/0040690 A1 | 2/2008 | Sakai |
| 2008/0086499 A1 | 4/2008 | Wefers et al. |
| 2008/0091846 A1 | 4/2008 | Dang |
| 2008/0120602 A1 | 5/2008 | Comstock et al. |
| 2009/0007077 A1 | 1/2009 | Musuvathi et al. |
| 2009/0055242 A1 | 2/2009 | Rewari et al. |
| 2009/0119133 A1 | 5/2009 | Yeransian et al. |
| 2009/0199160 A1 | 8/2009 | Vaitheeswaran et al. |
| 2009/0210914 A1* | 8/2009 | Suzuki ............. H04N 21/23438 |
| | | 725/87 |
| 2009/0271779 A1* | 10/2009 | Clark ................ G06F 17/30174 |
| | | 717/171 |
| 2009/0282457 A1 | 11/2009 | Govindavajhala |
| 2009/0287746 A1 | 11/2009 | Brown |
| 2009/0328171 A1 | 12/2009 | Bayus et al. |
| 2010/0060926 A1 | 3/2010 | Smith et al. |
| 2010/0064230 A1 | 3/2010 | Klawitter et al. |
| 2010/0064258 A1 | 3/2010 | Gorczowski et al. |
| 2010/0091317 A1 | 4/2010 | Williams et al. |
| 2010/0161616 A1 | 6/2010 | Mitchell |
| 2010/0179883 A1 | 7/2010 | Devolites |
| 2010/0199263 A1 | 8/2010 | Clee et al. |
| 2010/0235392 A1* | 9/2010 | McCreight ........ G06F 17/30949 |
| | | 707/780 |
| 2011/0021250 A1 | 1/2011 | Ickman et al. |
| 2011/0088014 A1 | 4/2011 | Becker et al. |
| 2011/0145037 A1 | 6/2011 | Domashchenko et al. |
| 2011/0153560 A1 | 6/2011 | Bryant et al. |
| 2011/0161375 A1 | 6/2011 | Tedder et al. |
| 2011/0173153 A1 | 7/2011 | Domashchenko et al. |
| 2011/0184689 A1 | 7/2011 | Awedikian et al. |
| 2011/0184766 A1 | 7/2011 | Virdhagriswaran |
| 2011/0270975 A1 | 11/2011 | Troup |
| 2011/0276875 A1 | 11/2011 | McCabe et al. |
| 2011/0283177 A1 | 11/2011 | Gates et al. |
| 2012/0150919 A1 | 6/2012 | Brown et al. |
| 2012/0159647 A1 | 6/2012 | Sanin et al. |
| 2012/0222014 A1 | 8/2012 | Peretz et al. |
| 2012/0232934 A1 | 9/2012 | Zhang et al. |
| 2012/0271657 A1 | 10/2012 | Anderson et al. |
| 2013/0024418 A1 | 1/2013 | Sitrick et al. |
| 2013/0054480 A1 | 2/2013 | Ross et al. |
| 2013/0066901 A1* | 3/2013 | Marcelais ......... G06F 17/30097 |
| | | 707/769 |
| 2013/0073942 A1 | 3/2013 | Cherkasov |
| 2013/0080760 A1 | 3/2013 | Li et al. |
| 2013/0138555 A1 | 5/2013 | Shishkov |
| 2013/0152047 A1 | 6/2013 | Moorthi et al. |
| 2013/0212692 A1 | 8/2013 | Sher-Jan et al. |
| 2013/0239217 A1 | 9/2013 | Kindler et al. |
| 2013/0282406 A1 | 10/2013 | Snyder et al. |
| 2013/0282407 A1 | 10/2013 | Snyder et al. |
| 2013/0282408 A1 | 10/2013 | Snyder et al. |
| 2013/0290786 A1 | 10/2013 | Artzi et al. |
| 2013/0298256 A1 | 11/2013 | Barnes et al. |
| 2014/0040867 A1 | 2/2014 | Wefers et al. |
| 2014/0075500 A1 | 3/2014 | B'Far et al. |
| 2014/0096262 A1 | 4/2014 | Casso |
| 2014/0282977 A1 | 9/2014 | Madhu et al. |
| 2014/0283098 A1 | 9/2014 | Phegade et al. |
| 2014/0337973 A1 | 11/2014 | Foster et al. |
| 2014/0358938 A1* | 12/2014 | Billmaier .......... G06F 17/30097 |
| | | 707/747 |
| 2015/0161538 A1 | 6/2015 | Matus et al. |
| 2015/0161620 A1 | 6/2015 | Christner |
| 2015/0215332 A1 | 7/2015 | Curcic et al. |
| 2016/0055132 A1 | 2/2016 | Garrison et al. |
| 2016/0104132 A1 | 4/2016 | Abbatiello et al. |

FOREIGN PATENT DOCUMENTS

| | | |
|---|---|---|
| CA | 2761405 A1 | 6/2012 |
| CA | 2733857 A1 | 9/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| JP | 11-143567 A | 5/1999 |
| JP | 11-296452 A | 10/1999 |
| WO | 01-95093 A2 | 12/2001 |
| WO | 2004/088543 A1 | 10/2004 |
| WO | 2007/120771 A2 | 10/2007 |
| WO | 2007/120772 A2 | 10/2007 |
| WO | 2007/120773 A2 | 10/2007 |
| WO | 2007/120774 A2 | 10/2007 |
| WO | 2008/049871 A1 | 5/2008 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |
| WO | 2013/072764 A2 | 5/2013 |

OTHER PUBLICATIONS

"AMS Real-Time Getting Started Guide," AMS Services, Vertafore, Inc., 9 pages, 2008.
"VERITAS Replication Exec version 3.1 for Windows," Administrator's Guide, pp. i-20, 49-68, and 119-160, Dec. 2004, 100 pages.
"Update insurance template according to changes in policy," retrieved from https://www.google.com/?tbm=pts, on Sep. 24, 2012, 2 pages.
"Adobe Introduces Adobe Acrobat 3.0 Software," *PR Newswire*, Jun. 3, 1996, 3 pages.

(56) References Cited

OTHER PUBLICATIONS

"CoreData Inc. Announces Technology and Marketing Agreement with MobileStar Network Corp.," *Business Wire*, Aug. 26, 1998, 2 pages.
"CoreData Offers E-mail Connectivity for RemoteWorx," *Newsbytes News Network*, Sep. 18, 1998, 1 page.
"FREE Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.
"Internet lifts servers to 64 bits," *Electronic Engineering Times*, Dec. 23, 1996, 3 pages.
"NotesPlusPlus," Feb. 25, 2006, retrieved from http://web.archive.org/web/20060225020405/http://www.sharewareconnection.com/notesplusplus.htm, on Oct. 10, 2013, 2 pages.
"SPSS Unveils Aggressive Development Plans: 1999 Product Releases Will Focus on Scalability and Deployment Solutions for the Enterprise," *Business Wire*, Feb. 18, 1999, 3 pages.
"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.
Announcement, "Coming Attraction, AMS Invites you to a Special Sneak Preview," AMS Services, 1 page, Aug. 1, 2008.
Brochure, "AMS 360—Business Growth. Productivity. Proven Technology.," Vertafore, Inc., 8 pages, 2008.
Brown et al., "Agency Management System and Content Management System Integration," U.S. Appl. No. 61/422,090, filed Dec. 10, 2010, 54 pages.
Corriveau et al., "AMS Portal Server: Bridging the Gap Between Web Presentation and the Back Office," White Paper, AMS Services, 13 pages, 2008.
Extended European Search Report, dated Jul. 9, 2012, for Application No. 07755347.7, 8 pages.
Extended European Search Report, dated Jun. 14, 2012, for Application No. 07755348.5, 8 pages.
Extended European Search Report, dated Jun. 19, 2012, for Application No. 07755349.3, 8 pages.
Extended European Search Report, dated Jun. 14, 2012, for Application No. 07755350.1, 9 pages.
Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.
Gadia, "A Homogeneous Relational Model and Query Languages for Temporal Databases," *ACM Transactions on Database Systems* 13(4):418-448, Dec. 1988.
Gage, "Sun's 'objective' is to populate Java networks," *Computer Reseller News*, Apr. 15, 1996, p. 69, 2 pages.
International Search Report and Written Opinion, mailed Aug. 5, 2008, for PCT/US2007/009040, 7 pages.
International Search Report and Written Opinion, mailed Jul. 18, 2008, for PCT/US2007/009041, 8 pages.
International Search Report and Written Opinion, mailed Jul. 14, 2008, for PCT/US2007/009042, 6 pages.
International Search Report and Written Opinion, mailed Jul. 18, 2008, for PCT/US2007/009043, 9 pages.
Murdock, "Office Automation System for Data Base Management and Forms Generation," U.S. Appl. No. 07/471,290, filed Jan. 26, 1990, 163 pages.
Snodgrass et al., "Temporal Databases," IEEE Computer, Sep. 1986, pp. 35-42.
Snyder et al., "Apparatus, Method and Article to Provide an Insurance Workflow Management System," U.S. Appl. No. 13/598,297, filed Aug. 29, 2012, 86 pages.
Batrouni et al., "Method and System of Assessing Risk Associated With Users Based At Least in Part on Online Presence of the User," U.S. Appl. No. 14/630,509, filed Feb. 24, 2015, 71 pages.
Srivastava et al., "Automated Software Testing Using Metahurestic Technique Based on an Ant Colony Optimization," International Symposium on Electronic System Design, Bhubaneswar, Dec. 20-22, 2010, 7 pages.
Woo et al., "Meaningful interaction in web-based learning: A social constructivist interpretation," *Internet and Higher Education* 10(1):15-25, 2007.
McDowell, "Performance Testing of Web Application Components Using Image Differentiation," U.S. Appl. No. 14/926,465, filed Oct. 29, 2015, 44 pages.
Yuan et al., "Using GUI Run-Time Sate as Feedback to Generate Test Cases," 29th International Conference on Software Engineering, IEEE 2007, 10 pages.

* cited by examiner

```
c:\DiffCatDemo>diffcat
DiffCat usage...
    DiffCat CATfile1 CAT file2 c:\DiffCatDemo>diffcat FS1\Demo.cat FS2\Demo.cat
[INFO] DiffCat comparing FS1\Demo.cat to FS2\Demo.cat...

c:\DiffCatDemo>
```

*FIG. 6*

```
c:\DiffCatDemo\FS1\Json45r11\readme.txt         c:\DiffCatDemo\FS1\Json45r11\readme.txt
Json.NET                                         Json.NET
http://james.newtonking.com/projects/jso        http://james.newtonking.com/projects/jso
https://www.codeplex.com/json/                   https://www.codeplex.com/json/
Description:                                     Description:
Json.NET makes working with JSON format          Json.NET makes working with JSON format
Json using LINQ to JSON or serialize you         Json using LINQ to JSON or serialize you
the JsonSerializer.                              the JsonSerializer.
```

FIG. 7A

```
c:\DiffCatDemo\FS2>makecat ..\Demo.cdf
Succeeded c:\DiffCatDemo\FS2>cd ..

c:\DiffCatDemo>diffcat FS1\Demo.cat FS2\Demo.cat
[INFO] Diffcat comparing FS1\Demo.cat to FS2\Demo.cat...
[ERROR]    !readme.txt hash values do not match!
           hash 1  0B-81-4E-37-F1-FA-78-9E-9B-A1-4D-E1-8B-A8-7C-D3-77-B4-5A-74
           hash 2  ED-80-F9-41-93-37-3D-6F-EB-D2-99-69-05-F4-06-04-93-2C-88-7C c:\DiffCatDemo>
```

FIG. 7B

BIT LEVEL COMPARATOR SYSTEMS AND METHODS

BACKGROUND

1. Technical Field

The present disclosure generally relates to comparing digital file systems more specifically, the present disclosure relates to comparing digital file systems at a bit-level.

2. Description of the Related Art

Data is typically stored in binary form in groups of bits, for example a group of eight (8) bits is called a "byte" or in 16 bits called a "word." Other sized groups of bits are also used in some systems. A bit is currently the smallest data unit available and is typically embodied as an electrostatic non-transitory storage medium comprising transistor (or similar electrical switching device) and a capacitive element, as a magnetic nontransitory storage medium comprising a magnetically readable/writeable media, or as an optical nontransitory storage medium comprising an optically readable/writeable media. Newer format nontransitory storage includes memristors, atomic or molecular storage devices, and quantum storage devices. Regardless of storage media format, every piece of binary data is traceable back to a series of storage elements, each of which retains a nontransitory state indicative of either a binary "zero" or a binary "one." An error as small as one bit can have a profound impact on the content of a particular file—for example, the letter "A" is represented in extended ASCII as a binary value of "01000001." A change in just one bit, for example to "01000011," changes the letter from "A" to "C." Thus, even relatively minor bit errors can have a significant impact on the data present in a file.

Modern data transfer rates and reliability continue to increase with improvements in network infrastructure. Data transfer rates of 6 to 50 megabits per second ("Mbps") are fairly commonplace. At a data transfer rate of 12 Mbps (i.e., 1.5 megabytes per second where 8 bits=1 byte), a fairly small image or file having a size of 4.5 megabytes requires about three seconds to transfer. During those three seconds data representative of 36 million bits of information will pass between the systems. Multiply this one file by ten, a hundred, or even a thousand-fold and one can readily appreciate the incredible quantity of data exchanged between systems.

The distribution of digital media continues to evolve in the face of changing technology. The earliest systems were often hardwired and required significant time and labor to manually rewire to modify or change programming routines. Over time, hardwiring gave way to vacuum tubes that in turn gave way to transistors leading to the concept of "software"—programs and algorithms that could be electronically stored and retrieved. Rather than hardwired programs, "software" included a nontransitory storage medium that included information embodied in a machine-readable format as stored binary code. The nontransitory storage medium evolved from reel-to-reel magnetic tape, to rotating magnetic media (i.e., "floppy disks"), to rotating optical media (i.e., compact disc and DVD) each of which stored binary data in a machine readable format. Given the wide availability of network connections, software distribution has entered a new era in which stored binary data is communicated from a nontransitory storage location on a remote server to a nontransitory storage location on a local client device. Such is exemplified by the Apple® AppStore and the Google® Play store that are available on many portable computing devices such as smartphones.

The volume of digital data generated on a daily basis is growing rapidly and some estimate that by 2020 up to 35 zetabytes ($35 \times 10^{21}$ bytes) of data may be generated annually. Much of this data is collected, sorted, parsed, analyzed, and stored as files on nontransitory storage media. In order to keep files to manageable sizes, data may be allocated or otherwise divided into file systems that contain tens, hundreds, or even thousands of files, each of which may contain megabytes ($10^6$ bytes) or even gigabytes ($10^9$ bytes) of data. Communicating, transmitting, or exchanging such large volumes of digital binary data frequently involves the duplication of file systems containing a large number of individual files either on a single device or on two different devices such as a client and server. In such instances, ensuring the integrity of the communicated binary data is essential to ensuring the accuracy of the information conveyed by the data. Comparing two instances of a single file on a bit-by-bit basis may be time consuming depending on the volume of binary data in the file. Comparing two instances of hundreds or thousands of files, some or all of which may contain considerable quantities of binary data volume, on a bit-by-bit basis can tax the capabilities of even the largest of computing systems.

SUMMARY

Ensuring data integrity in files that are duplicated and/or communicated between computing systems is essential for providing reliable and accurate data and/or content distribution. As storage costs decrease and as the volume of data increases, both the public and private sectors face an increasing volume of digital data stored in files on local or geographically diverse data storage systems. The ability to communicate large volumes of digital data between storage systems at near real-time speed provides convenient access to such data, however the data communicated and/or duplicated between systems or on the same system must be accurate to ensure reliability and boost confidence in such digital data storage and processing systems.

Comparing two files on a bit-by-bit basis may be possible when file sizes are limited and computing resources are available. However, from a practical standpoint, such a bit-by-bit file comparison is often impractical. In instances where a direct comparison at the bit level is impossible or impractical (e.g., where unlimited file sizes exist and where processor time is limited), one can use a hashing function to reduce the content of a file to a fixed-length output that provides a shortened reference to the original data. Applying a hashing function to a file generates a unique hash value determined by the file contents. A file that produces a first hash value and is then changed will produce a completely different second hash value even when the same hashing function is used to generate the "before" and "after" hash values. Thus, while hash values cannot indicate the specific change in a file, hash values provide a rapid, easy, and accurate indicator on whether the content of a file has changed.

This property of hash values may be advantageously employed to provide a bit-level comparator able to detect changes between file systems containing any number of any file size and/or type, including encrypted or otherwise protected files. Such a bit level comparator first generates a hash value associated with each file in a file system by applying a hashing function to the files included in the file system. If such files remain unchanged, applying the same hashing function at a different time or to the same files on a different computing system will yield the same hash value for each file in the file system. If one file is changed, even by a single bit, applying the same hashing function at a different time or on a different computing system will yield a different hash value for each changed file. Thus, by comparing the hash value generated by a file included in a first file system (i.e., a file on a first system and/or a file on a system at a first time) with the hash value associated with the corresponding file included in a second file system (i.e., the corresponding file on a second system or the file on the system at a second time), one can determine whether changes as small as a single bit have occurred.

The bit-level comparator generates a catalog file containing file identifier and logically associated hash value for each file included in a file system. Such catalog files may be generated using catalog generation utilities such as Microsoft's MakeCat tool. The bit level comparator the compares the hash values in each of two catalog files to detect corresponding file identifiers having different logically associated hash values. Corresponding file identifiers having identical logically associated hash values are considered unchanged between the two file systems providing the catalog files. Conversely, corresponding file identifiers having differing logically associated hash values are considered different or changed between the two file systems providing the catalog files.

Prior to generating the catalog file for a file system, the bit-level comparator generates a catalog definition file (.cdf) for the file system. The catalog definition file includes a catalog definition header portion containing information related to items such as a catalog file name and a hashing function. The catalog definition file further includes a catalog listing portion containing the file name and location associated with each file in the file system that will be included in the catalog definition file (and ultimately, the catalog file generated using the respective catalog definition file). Since duplicate file names may cause errors in performing the bit-level comparison, the bit-level comparator may autonomously, manually, or semi-autonomously rename duplicate files using a defined naming protocol.

A method to compare a first directory including a number of machine readable digital files having a 1:1 correspondence with a number of machine readable digital files included in each of a number of second directories to detect bit-level differences between each of the number of machine readable digital files in the first directory and the corresponding machine readable digital file in some or all of the number of second directories may be summarized as including: creating by at least one processor a catalog definition file that includes a number of file identifiers, each file identifier corresponding to and associated with one of a number of machine-readable digital files included in a first file system; generating by the at least one processor via the catalog definition file a first catalog containing a number of hash values, each of the number of hash values logically associated with a respective one of the number of file identifiers included in the catalog definition file; storing data indicative of the first catalog file in at least one nontransitory storage medium by the at least one processor, the at least one nontransitory storage medium communicably coupled to the at least one processor; generating via the catalog definition file a respective second catalog file for each of the number of second file systems, each second catalog file including a number of hash values, each of the hash values logically associated with a respective one of the file identifiers included in the respective second catalog file; storing each of the second catalog files in the at least one nontransitory storage medium by the at least one processor; and determining by the at least one processor whether each machine readable digital file included in the first file system is identical at a bit level with a corresponding machine readable digital file included in each of the number of second file systems by comparing on a file-by-file basis, the hash value associated with the one of the number of file identifiers included in the stored first catalog file with the hash value logically associated with the corresponding one of the number of file identifiers included in each of the number of stored second catalogs.

The method to compare a first directory including a number of machine readable digital files having a 1:1 correspondence with a number of machine readable digital files included in each of a number of second directories to detect bit-level differences between each of the number of machine readable digital files in the first directory and the corresponding machine readable digital file in some or all of the number of second directories may further include, prior to creating the catalog definition file: identifying duplicate file identifiers included in the catalog definition file by the at least one processor; and modifying the identified duplicate file identifiers included in the catalog definition file using one or more defined rules to eliminate file identifier duplication within the catalog definition file.

The method to compare a first directory including a number of machine readable digital files having a 1:1 correspondence with a number of machine readable digital files included in each of a number of second directories to detect bit-level differences between each of the number of machine readable digital files in the first directory and the corresponding machine readable digital file in some or all of the number of second directories may further include: inserting catalog header information into the catalog definition file.

Generating by the at least one processor via the catalog definition file a first catalog file containing a number of hash values may include: generating a first catalog file containing a number of hash values determined using an SHA1 hashing function,; and generating by the at least one processor via the catalog definition file a respective second catalog file for each of the number of second file systems, each second catalog file containing a number of hash values includes: generating a number of second catalog files, each of the number of second catalog files containing a number of hash values determined using an SHA1 hashing function.

The method to compare a first file system including a number of machine readable digital files having a 1:1 correspondence with a number of machine readable digital files included in each of a number of second file systems to detect bit-level differences between each of the number of machine readable digital files in the first file system and the corresponding machine readable digital file in some or all of the number of second file systems may further include: for each instance where the hash value logically associated with a one of the file identifiers included in the first catalog file does not match the hash value of the corresponding file identifier in some or all of the number of second catalog files, generating by the at least one processor an alert that includes data indicative of the identity of each file identifier for which the hash values do not match.

Generating an alert that includes data indicative of the identity of each file identifier for which the hash values do not match may further include generating by the at least one processor an alert that includes data indicative of: the respective file identifier, the hash value logically associated with the respective file identifier included in the first catalog file and the hash value logically associated with the respective file identifier included in the second catalog file.

The method to compare a first file system including a number of machine readable digital files having a 1:1 correspondence with a number of machine readable digital files included in each of a number of second file systems to detect bit-level differences between each of the number of machine readable digital files in the first file system and the corresponding machine readable digital file in some or all of the number of second file systems may further include: for each instance where the hash value logically associated with a one of the file identifiers included in the first catalog file does not match the hash value of the corresponding file identifier in some or all of the number of second catalog files, generating by the at least one processor an alert that includes data indicative of the identity of each file identifier for which the hash values do not match.

Generating an alert that includes data indicative of the identity of each file identifier for which the hash values do not match may further include generating by the at least one processor an alert that includes data indicative of: the respective file identifier, the hash value logically associated with the respective file identifier included in the first catalog file, and the hash value logically associated with the respective file identifier included in the second catalog file.

A nontransitory, computer readable media may be summarized as one containing machine readable, processor executable, instructions that when executed by at least one processor, cause the at least one processor to function as a bit-level file comparator by: creating a catalog definition file that includes a number of file identifiers, each file identifier corresponding to and associated with a machine-readable digital file included in a first file system; generating via the catalog definition file a first catalog file containing a number of hash values, each of the number of hash values logically associated with a respective one of the number of file identifiers included in the catalog definition file; storing the first catalog in at least one communicably coupled nontransitory storage medium; generating via the catalog definition file a second catalog file for each of the number of second file systems, each second catalog file including a number of hash values logically associated with a respective one of a number of file identifiers included in the respective second catalog file; storing each of the number of second catalogs in the at least one communicably coupled nontransitory storage medium; and determining whether each machine readable digital file included in the first file system is identical at a bit level with a corresponding machine readable digital file included in each of the number of second file systems by comparing on a file-by-file basis, the hash value logically associated with one of the number of file identifiers in the stored first catalog file with the hash value logically associated with the corresponding one of the number of file identifiers included in each of the number of stored second catalog files.

The nontransitory, computer readable media may further include machine readable, processor executable, instructions that when executed by at least one processor, further cause the at least one processor to function as a bit-level file comparator by: identifying duplicate identifiers included in the catalog definition file; and modifying the identified duplicate file identifiers included in the first catalog definition file using one or more defined rules to eliminate file identifier duplication within the catalog definition file.

The nontransitory, computer readable media may further include machine readable, processor executable, instructions that when executed by at least one processor, further cause the at least one processor to function as a bit-level file comparator by: inserting catalog header information into the catalog definition file.

Generating via the catalog definition file a first catalog file containing a number of hash values may include generating a first catalog file containing a number of hash values determined using an SHA1 hashing function; and generating via the catalog definition file a respective second catalog file for each of the number of second file systems, each second catalog file containing a number of hash values may include generating a number of second catalog files, each of the number of second catalog files containing a number of hash values determined using an SHA1 hashing function.

The nontransitory, computer readable media may further include machine readable, processor executable, instructions that cause the at least one processor to function as a bit-level file comparator by: for each instance where the hash value logically associated with a one of the file identifiers included in the first catalog file does not match the hash value logically associated with the corresponding file identifier in one or more of the number of second catalog files, generating an alert that includes data indicative of the identity of each file identifier for which the hash values do not match.

The machine readable, processor executable, instructions that cause the at least one processor to function as a bit-level file comparator by generating an alert that includes data indicative of the identity of each file identifier for which the hash values do not match, may further cause the at least one processor to function as a bit-level file comparator by: generating an alert that includes data indicative of: the respective file identifier, the hash value logically associated with the respective file identifier included in the first catalog file and the hash value logically associated with the respective file identifier included in the second catalog file.

The nontransitory, computer readable media may further include machine readable, processor executable, instructions that cause the at least one processor to function as a bit-level file comparator by: for each instance where the hash value logically associated with a file identifier included in the first catalog file does not match the hash value logically associated with the corresponding file identifier in one or more of the number of second catalog files, generating an alert that includes data indicative of the identity of the one or more second catalog files including the respective non-matching hash value.

The machine readable, processor executable, instructions that cause the at least one processor to function as a bit-level file comparator by generating an alert that includes data indicative of the identity of each of the one or more second catalog files for which the hash values do not match, may further cause the at least one processor to function as a bit-level file comparator by: generating an alert that includes data indicative of: the machine readable digital file name associated with the respective file identifier and the hash value logically associated with the in the first catalog file; and, the machine readable digital file name associated with the respective file identifier and the hash value logically associated with the respective file identifier in the second catalog file.

A file comparator system to compare a first file system including a number of machine readable digital files having a 1:1 correspondence with a number of machine readable digital files included in each of a number of second file systems to detect bit-level differences between each of the number of machine readable digital files in the first file system and the respective machine readable digital file in each of the number of second file systems may be summarized as including at least one nontransitory storage medium that, when in operation, stores data indicative of the number of machine readable digital files included in the first file system and data indicative of the number of machine readable digital files included in each of the number of second file systems; at least one processor communicably coupled to the at least one nontransitory storage medium; and at least one set of machine readable, processor executable, instructions included in the at least one nontransitory storage medium, that when executed by the at least one processor cause the at least one processor to: create a catalog definition file that includes a number of file identifiers, each file identifier corresponding to and associated with one of a number of machine readable digital files included in the first file system; generate via the catalog definition file a first catalog file containing a number of hash values, each of the number of hash values logically associated with a respective one of the number of file identifiers included in the first catalog definition file; store the first catalog in the at least one nontransitory storage medium; generate via the catalog definition file a respective second catalog file for each of the number of second file systems, each second catalog file including a number of hash values, each of the hash values logically associated with a respective one of the number of file identifiers included in the respective second catalog file; store each of the number of second catalog files in the at least one nontransitory storage medium; and determine whether each machine readable digital file included in the first file system is identical at a bit level with a corresponding machine readable digital file included in each of the number of second file systems by comparing on a file-by-file basis, the hash value logically associated with each of the number of file identifiers included in the stored first catalog file with the hash value logically associated with the corresponding one of the file identifiers included in each of the number of stored second catalog files.

The one or more sets of machine readable, processor executable instructions may cause the at least one processor to further: identify duplicate file identifiers included in the catalog definition file; and modify the identified duplicate file identifiers included in the catalog definition file using one or more defined rules to eliminate file identifier duplication within the catalog definition file. The one or more sets of machine readable, processor executable instructions may cause the at least one processor to further: insert catalog header information into the catalog definition file.

The one or more sets of machine readable, processor executable instructions that cause the at least one processor to generate via a catalog definition file a first catalog file including a number of hash values, may cause the at least one processor to further: generate a first catalog file containing a number of hash values determined using an SHA1 hashing function; and the one or more sets of machine readable, processor executable instructions that cause the at least one processor to generate via a catalog definition file a respective second catalog file for each of the number of second file systems, may further cause the at least one processor to: generate a number of second catalog files, each of the number of second catalog files containing a number of hash values determined using an SHA1 hashing function.

The one or more sets of machine readable, processor executable instructions may cause the at least one processor to further: for each instance where the hash value logically associated with a one of the file identifiers included in the first catalog file does not match the hash value logically associated with the corresponding file identifier in some or all of the number of second catalog files, generate an alert that includes data indicative of the identity of each file identifier for which the hash values do not match.

The one or more sets of machine readable, processor executable instructions that cause the at least one processor to generate an alert that includes data indicative of the identity of each file identifier for which the hash values do not match, may cause the at least one processor to further: generate an alert that includes data indicative of: the respective file identifier, the hash value logically associated with the respective file identifier included in the first catalog file and the hash value logically associated with the respective file identifier included in the second catalog file.

The one or more sets of machine readable, processor executable instructions may further cause the at least one processor to: for each instance where the hash value logically associated with the file identifier included in the first catalog file does not match the hash value logically associated with the corresponding file identifier in some or all of the number of second catalog files, generate an alert that includes data indicative of the identity of the one or more second catalog files including the respective non-matching hash value.

The one or more sets of machine readable, processor executable instructions that cause the at least one processor to generate an alert that includes data indicative of the identity of the one or more second catalog files for which the hash values do not match, may cause the at least one processor to further: generate an alert that includes data indicative of: the machine readable digital file name associated with the respective file identifier and the hash value logically associated with the respective file identifier included in the first catalog file; and, the respective machine readable digital file name associated with the respective file identifier and the hash value logically associated with the respective file identifier in the respective second catalog file.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 6 is a screen capture of an illustrative bit-level comparator output generated when the machine-readable digital files in a first file system match the corresponding machine readable digital files in a second file system, according to one illustrated embodiment.

FIG. 7A are screen captures of an illustrative machine-readable digital file in a first file system and a corresponding illustrative machine-readable digital file to which one character has been added in a second file system, according to one illustrated embodiment.

FIG. 7B is a screen capture of an illustrative bit-level comparator output generated when the machine-readable digital files in a first file system differ at the bit-level from the corresponding machine-readable digital files in a second file system, such as the files shown in FIG. 7A, according to one illustrated embodiment.

DETAILED DESCRIPTION

Figure 1:
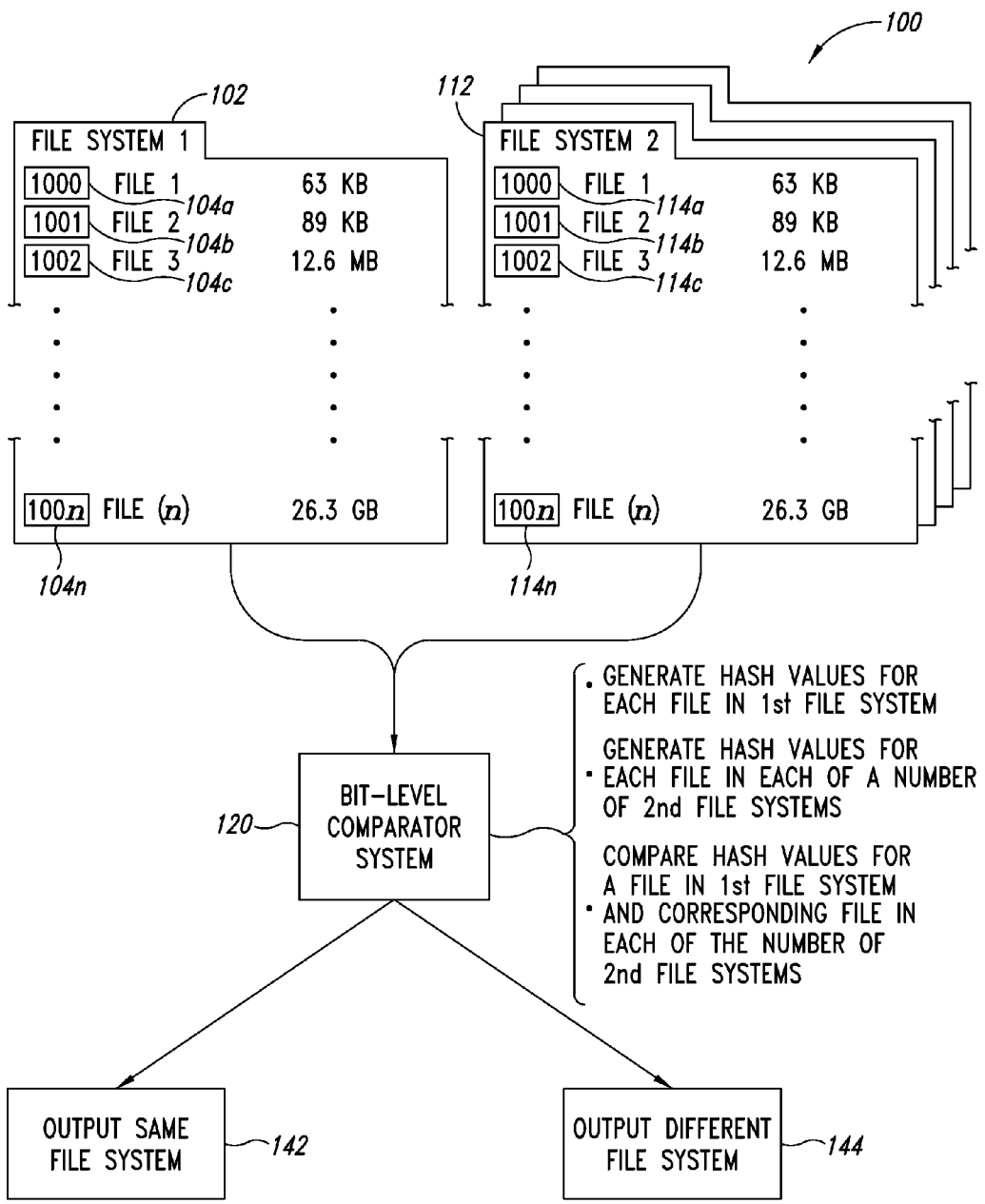
FIG. 1 is a block diagram of an illustrative bit-level file comparator for comparing any number of machine-readable digital files included in a first file system with a number of corresponding machine-readable digital files included in any number of second file systems, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known processes, procedures, algorithms, and/or structures associated with hashing algorithms, hashing functions, the MakeCat catalog generation utility offered by Microsoft® (Redmond, Wash.), have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive, sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context makes clear otherwise, the term "file system" as used herein refers to a location, for example a directory, containing any number of individual files. Such files can be of the same or different type and may be of any size. All or a portion of the files in the file system may be encrypted and/or encoded. Files included in the file system may include executable or non-executable files. Files included in the file system may include one or more structured or unstructured data files.

As used herein a catalog generation utility such as "MakeCat" refers to a command line CryptoAPI tool that creates an unsigned catalog file that includes a hash value logically associated with each file included in the catalog definition file (.cdf) used to generate the catalog file along with associated attributes of each respective file included in the catalog definition file. The MakeCat catalog generation utility is included as part of the Microsoft Windows Software Development Kit (SDK) for Windows 7 and .NET Framework 4.0 and is installed, by default, in the \Bin folder of the SDK installation path. The term catalog generation utility includes any former, current, or future developed CryptoAPI tool capable of creating a catalog file.

As used herein the term, "catalog definition file" refers to a text file having a defined format and including a collection of file information gathered from an originating file system. In at least some instances, the catalog definition file may be manually generated at least in part using a text editor. In at least some instances, the catalog definition file may be autonomously generated by one or more systems, processes and/or devices. Each catalog definition file includes a list of machine-readable digital files resident in the originating file system and also includes the attributes of the machine-readable digital files resident in the originating file system that are to be cataloged using the catalog generation utility.

As used herein the term "catalog file" refers to the catalog file (.cat) generated by a catalog generation utility such as "MakeCat" when run on a catalog definition file. The catalog file includes a collection of cryptographic hashes, or thumbprints, each generated based upon and associated with a file included in the original file system used to create the catalog definition file used to provide the catalog file.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

FIG. 1 shows an illustrative bit-level file comparator system 100 useful for comparing a first file system 102 including any number of machine-readable digital files 104a-104n (collectively, "files 104") to any number of second file systems 112, each of which includes a corresponding number of machine-readable digital files 114a-114n (collectively, "files 114"). The comparison between each file 104 in the first file system 102 and the corresponding file 114 in each of a number of second file systems 112 is performed using a bit-level file comparator 120 capable of detecting bit level differences between each of the files 104 in the first file system 102 and the corresponding file 114 in each of a number of second file systems 112.

The comparison performed by the bit-level file comparator 120 is accomplished by generating a first catalog file (.cat) for the files 104 included in the first file system 102 and by generating a number of respective second catalog files for the corresponding files 114 included in a number of second file systems 112. The catalog file logically associated with the first file system 102 includes a collection of cryptographic hashes, or thumbprints, each of which corresponds with a file 104 included first file system 102. The catalog file logically associated with each of the number of second file systems 112 includes a collection of cryptographic hashes, or thumbprints, each of which correspond with a file 114 included in the respective second file system 112.

In operation, the bit-level file comparator 120 compares the hash value logically associated with each file 104 included in the first file system 102 with the hash value logically associated with the corresponding file 114 included in each of the number of second file systems 112. Since the hashing function returns a different hash value even when only a one bit difference exists in the compared files, the bit-level comparator 120 is advantageously able to rapidly detect differences as small as a single bit between even the largest of data files simply by comparing the hash values logically associated with the files.

Responsive to the outcome of the comparison between the hash values logically associated with each of the files 104 in the first file system 102 with the hash values logically associated with the corresponding files 114 in the second filing system 112, the bit-level file comparator 120 generates user perceptible output. If the hash values logically associated with the files 104 in the first file system 102 are identical to the hash values logically associated with the corresponding files 114 in a second file system 112, then the bit-level comparator 120 generates an output 142 indicative of a MATCH condition between the first file system 102 and the respective second file system 112. On the other hand, if the hash values logically associated with the files 104 in the first file system 102 are not identical to the hash values logically associated with the corresponding files 114 in a second file system 112, then the bit-level comparator 120 generates an output 144 indicative of a NO-MATCH condition between the first file system 102 and the respective second file system 112.

The first file system 102 and some or all of the number of second file systems 112 may be collocated on a common computing, data processing, and/or data storage system, for example on one or more nontransitory storage media disposed in a single computing system such as a network server. In some instances, the first file system 102 and some or all of the number of second file systems 112 may be remotely distributed on any number of computing, data processing, and/or data storage systems. In at least some implementations, the bit-level file comparator's 120 capability to compare file systems that include a relatively large number of files (e.g., hundreds or even millions of files) at the bit level permits a content provider to ensure that the files included in content distributed to diverse locations are identical down to the bit level with the original content generated by the provider.

The ability to quickly identify bit-level differences in individual files is advantageous in detecting corrupted or altered files, particularly in situations involving a large number of files and/or large file sizes. Such situations frequently occur in the context of content distribution. For example, technical writers may develop help content for a particular product. The technical writers compile their content into a number of files containing data representative of text, images, audio and video help content. The content is reviewed for accuracy and legal compliance prior to distribution by a content distributor to a number of geographically diverse servers operated by system users. In such an instance, the bit-level file comparator 120 can generate a catalog file associated with the help file system (i.e., the first file system) resident on the content distributor's server. The bit-level file comparator 120 can also generate a respective catalog file associated with each help file system resident on each respective system user's server (i.e., each of the second file systems). By comparing the catalog file associated with the content distributor's help file system to the catalog file associated with each respective system user's help file system, the bit-level file comparator 120 can quickly and accurately determine whether a particular system user's help file system corresponds at a bit-level with the content distributor's original help file system.

Figure 2:
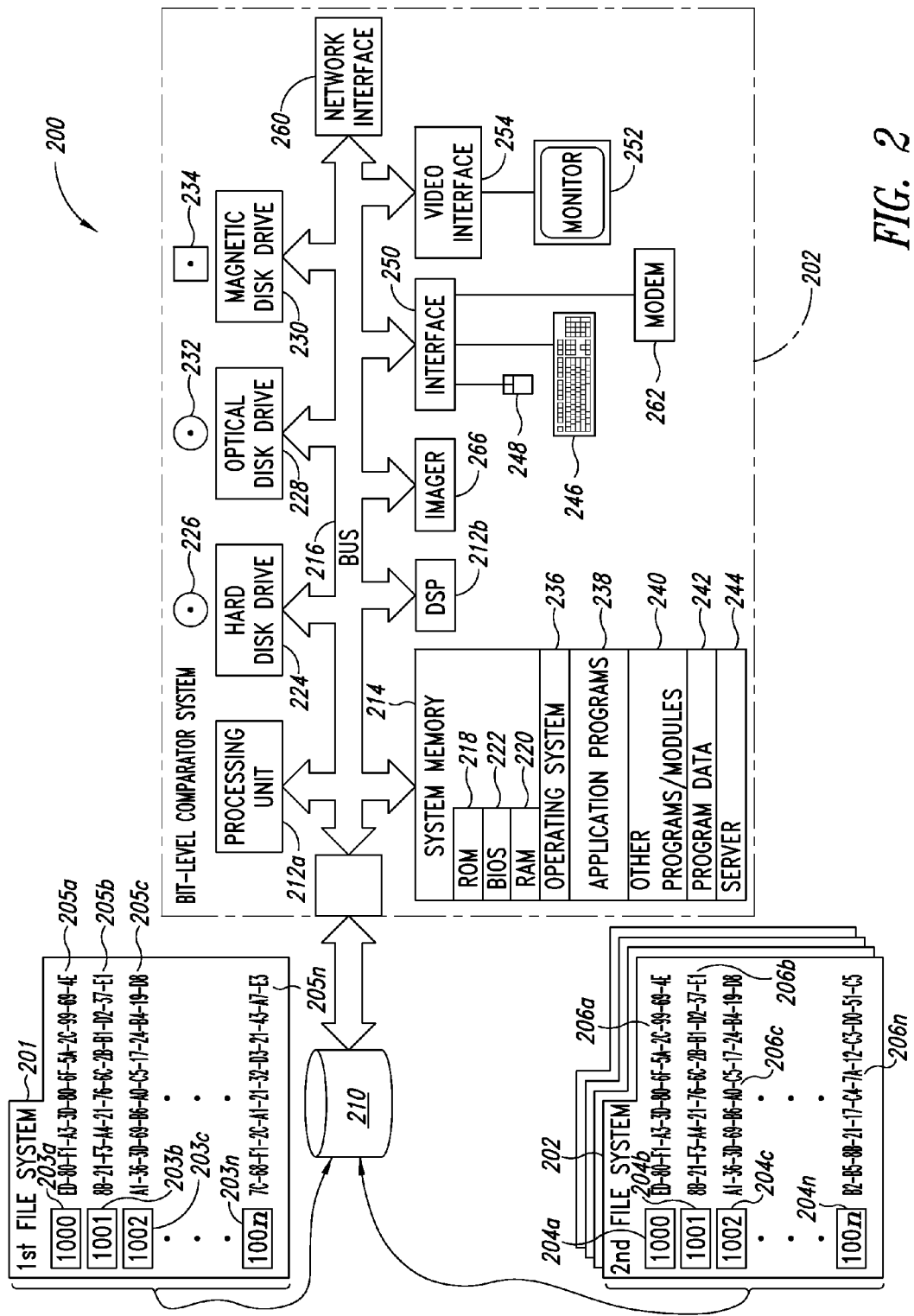
FIG. 2 is a block diagram of an illustrative bit-level file comparator system, according to one illustrated embodiment.

FIG. 2 and the following discussion provide a brief, general description of a suitable networked insurance industry environment 200 in which the various illustrated embodiments can be implemented. Although not required, the embodiments will be described in the general context of computer-executable instructions, such as program application modules, objects, or macros stored on computer- or processor-readable media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), networked PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices or media.

FIG. 2 shows a bit-level comparator environment 200 comprising one or more bit-level comparator systems 120 (only one illustrated) and one or more associated nontransitory computer- or processor readable storage medium 210 (only one illustrated). The associated nontransitory computer- or processor readable storage medium 210 is communicatively coupled to the bit-level comparator system(s) 120 via one or more communications channels, for example one or more parallel cables, serial cables, or wireless channels capable of high speed communications, for instance via Firewire®.

In at least some implementations, the nontransitory storage medium 210 can include, store, or otherwise retain a first catalog file 201 that includes a number of first file identifiers 203a-203n (collectively "first file identifiers 203") each of which corresponds to and is associated with a respective machine-readable digital file 104 included in the first file system 102. Thus, each of the first file identifiers 203, and consequently, each of the first file system files 104, is logically associated with a respective first hash value 205a-205n (collectively, "first hash value 205").

In at least some implementations, the nontransitory storage medium 210 can also include, store, or otherwise retain any number of second catalog file(s) 202 each of which includes a number of second file identifiers 204a-204n (collectively "second file identifiers 204"). Each of the second file identifiers 204 corresponds to and is associated with a respective machine-readable digital file 114 included in one of the number of second file systems 112. Thus, each of the second file identifiers 204, and consequently, each of the second file system files 114, is logically associated with a respective second hash value 206a-206n (collectively, "second hash value 206").

The bit-level comparator environment 200 may employ other computer systems and network equipment, for example additional servers, proxy servers, firewalls, routers and/or bridges. The bit-level comparator system(s) 120 will at times be referred to in the singular herein, but this is not intended to limit the embodiments to a single device since in typical embodiments there may be more than one bit-level comparator system(s) 120 involved. Unless described otherwise, the construction and operation of the various blocks shown in FIG. 2 are of conventional design. As a result, such blocks need not be described in further detail herein, as they will be understood by those skilled in the relevant art.

The bit-level comparator system(s) 120 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the bit-level comparator system(s) 120, such as during start-up.

The bit-level comparator system(s) 120 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the bit-level comparator system(s) 120. Although the depicted bit-level comparator system(s) 120 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include one or more processor executable instruction sets that cause the one or more processor(s) 212 to function as a catalog definition file generator. The catalog definition file generator can manually or autonomously generate a catalog definition file (e.g., a .cdf file) for some or all of the files 104 included in the first file system 102. In at least some instances, the catalog definition file generator may prompt the user for a catalog definition file name and file directory or similar location information for the files included in the first file system 102 and each of the second file system(s) 112. Using this information, the application program may generate a catalog definition file for each respective file system that includes header information such as:
 Name=[User Supplied Catalog Definition File Name]
 PublicVersion=[1]
 CatalogVersion=[2]
 HashAlgorithms=SHA1
 PageHashes=True The catalog definition file generator may also autonomously generate the catalog definition file, for example by executing a command line instruction that outputs the contents of the respective file system in a format acceptable to the catalog generation subsystem. The command line instruction may include one or more manually entered or autonomously generated commands such as:
 'find . -type f -printf %f=%p\\n'

The catalog definition file generator outputs a text file containing the header information and a listing of the files included in the respective source file system in a format that is amenable to the catalog generation utility.

The application programs 238 may also include one or more processor-executable instruction sets that when executed by the one or more processor(s) 212 cause one or more processor(s) 212 to function as a duplicate file resolver. The duplicate file resolver identifies duplicate file identifiers in the catalog definition file. Additionally, in at least some implementations, the duplicate file resolver amends or otherwise edits the identified duplicate file identifiers consistently throughout the catalog definition file using a defined rule set to resolve duplicate file names. In some instances, the duplicate file resolver may output a list of duplicate file identifiers that a system user manually edit to eliminate the duplicate file identifiers. In some instances, the duplicate file resolver may autonomously detect and resolve duplicate file identifiers appearing in the catalog definition file using one or more defined serialization rules, for example by adding a numeral (1, 2, 3, . . . etc.) or letter (a, b, c, . . . etc.) to each of the file identifiers to eliminate the duplication of file identifiers within the catalog definition file. In some instances, the duplicate file resolver may use a manually generated, semi-autonomously generated, or autonomously generated command line instruction to identify the duplicate file identifiers, for example:
 'find . -type f -printf %f=%p\\n|sort|uniq -d -c'

The duplicate file resolver outputs a manually generated, semi-autonomously generated, or autonomously generated text output containing the header information and a listing of the contents of the file system without duplicate file identifiers and in a format that is amenable to the catalog generation utility.

After generating the catalog definition file, identifying duplicate file identifiers, and resolving duplicate file identifiers, the bit level comparator system 102 uses the catalog definition file to generate catalog files for the first file system 102 and for each of the second file system(s) 112 using a catalog generation utility. In at least some implementations, the catalog generation utility may include the MakeCat tool provided by the Microsoft® Windows® operating system.

The catalog generation utility generates a first catalog file 201 using the first catalog definition file and a number of second catalog file(s) 202. Each of the number of second catalog file(s) 202 corresponds to a respective one of the number of second file system(s) 112 used to generate the second catalog file 202. The first catalog file 201 includes a number of first file identifiers 203 each corresponding to and associated with (based on the catalog definition file) a respective file 104 included in the first file system 102. Each of the first file identifiers 203, and consequently, each of the files 104 in the first file system 102, is logically associated with a respective first hash value 205. Each of the second catalog file(s) 202 includes a number of second file identifiers 204, each corresponding to and associated with (again based on the catalog definition file) a respective file 114 in one of the number of second file system(s) 112. Each of the second file identifiers 204, and consequently, each of the files 114 in each of the second file system(s) 112, is logically associated with a respective second hash value 206.

The application programs 238 may include one or more bit-level comparators to compare on a file-by-file basis, the hash value 205 logically associated with a file identifier 203 included in the first catalog file 201 with the hash value 206 logically associated with the corresponding file identifier 204 included in the second catalog file 202. For example, file "1000" (i.e., file identifier 203a) in the first catalog file 201 has a logically associated hash value 205a of: ED-80-F1-A3-3D-80-6F-5A-2C-99-69-4E. The comparator will compare hash value 205a with the hash value 206a that is logically associated with file "1000" (i.e., identifier file 204a) that appears in each of the number of second catalog files 202. A matching hash value confirms that file 1000 (i.e., file 114a) in the respective second file system 112 is identical at a bit-level to file 1000 (i.e., file 104a) in the first file system 114. Conversely, a non-matching hash value confirms that file 1000 (i.e., file 114a) in the respective second file system 112 is NOT identical at a bit level with file 1000 (i.e., file 104a) in the first file system 114.

In at least some implementations some or all of the catalog file generator, the duplicate file resolver, the catalog generation utility, and the one or more comparators may be provided as an integrated processor-executable instruction set capable of providing a seamless user experience. In such instances, the integrated package may provide one or more graphical user interfaces in lieu of the command line instructions discussed in detail above. Such graphical user interfaces may provide dialog boxes or similar interactive interfaces that enable the system user to provide one or more of: catalog definition file names, a directory and/or location for the files included first file system 102, and each of the number of second file systems 112, and a defined hashing function.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

A system user can enter commands and information into the bit level comparator system(s) 120 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The bit-level comparator system(s) 120 can include other output devices, such as speakers, printers, etc.

The bit-level comparator system(s) 120 can operate in a networked environment using logical connections to one or more remote computers and/or devices. For example, the bit-level comparator system(s) 120 can operate in a networked environment using logical connections to one or more remote devices having nontransitory storage that store or otherwise retain the first file system 102 and/or one or more second file system(s) 112. For example, the bit level comparator 102 may be communicably coupled, for example via a local area network or LAN, to a content distribution server having nontransitory storage retaining the first file system 102 and communicably coupled, for example via a worldwide network such as the Internet, to any number of individual clients having nontransitory storage retaining one or more second file systems 112. Communications may be via tethered/wired and/or wireless network architecture, for instance wired and wireless enterprise-wide computer networks, intranets, extranets, and/or the Internet. Other embodiments may include other types of communications networks including telecommunications networks, cellular networks, paging networks, and other mobile networks.

Figure 3:
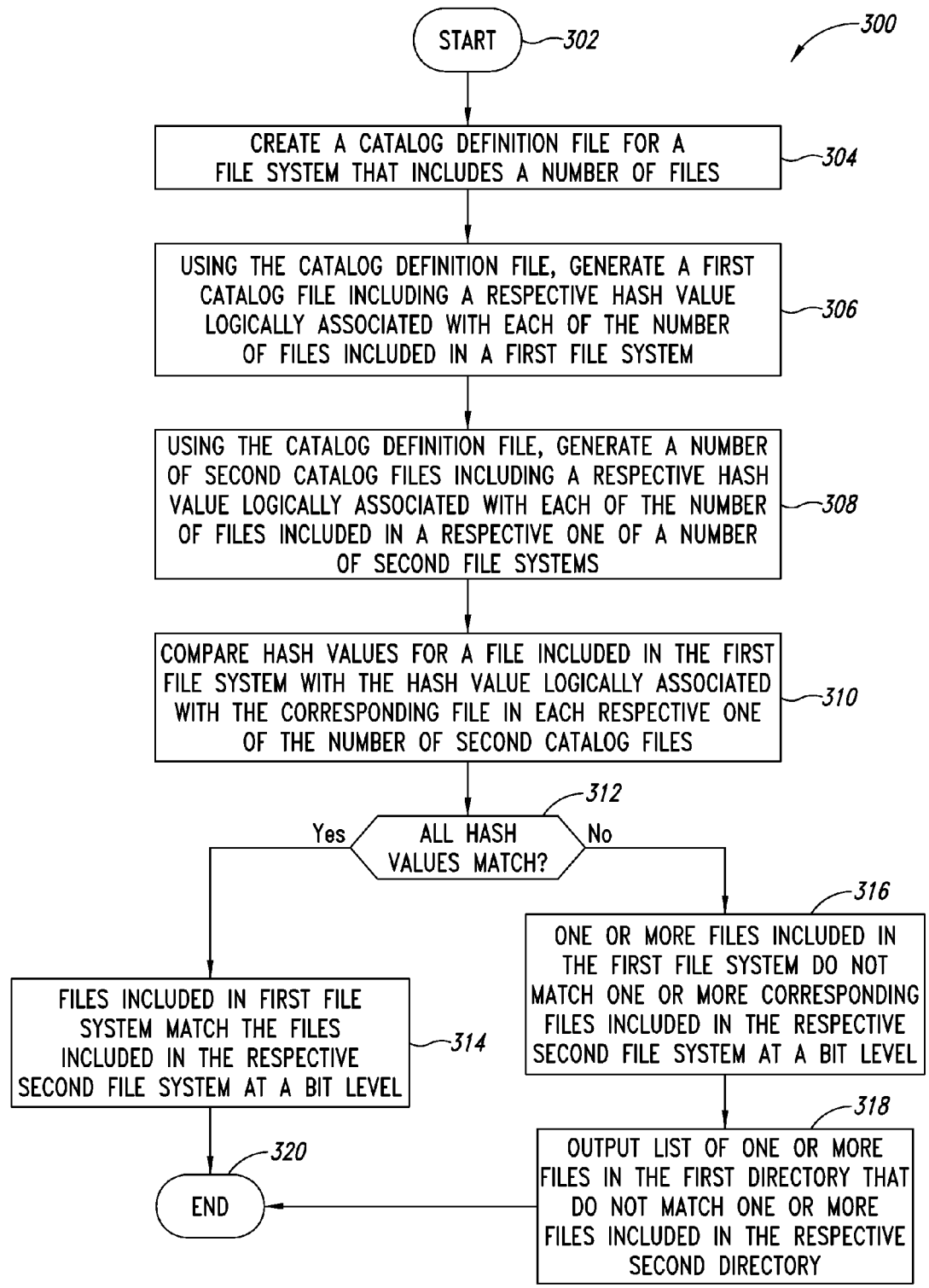
FIG. 3 is a high-level logic flow diagram of an illustrative method of comparing at a bit-level any number of machine-readable digital files in a first file system with any number of corresponding machine-readable digital files in any number of second file systems using a bit-level file comparator such as that in FIGS. 1 and 2, according to one illustrated embodiment.

FIG. 3 shows a high-level logic flow diagram of a bit-level file comparator method 300, according to an embodiment. The bit-level file comparator 120 compares a hash value 205 generated using and associated with each file 104 included in a first file system 102 with a hash value 206 generated using and associated with a corresponding file 114 included in any number of second file systems 112. Such comparisons are particularly advantageous in content distribution situations where a large number of files may be distributed by a content distributor across a large number of client platforms. In such instances, ensuring each client has received all of the files and verifying the contents of each of the received files have not been altered, changed, or corrupted through the distribution process assures the client of the validity and veracity of the file contents. The bit level file comparator method 300 commences at 302.

At 304, the bit-level comparator system 120 creates a catalog definition file that identifies the files for inclusion in the catalog file. The catalog definition file includes a file identifier and directory (or other location) information for each file included in the first filing system 102 and each of the number of second filing system(s) 112. The catalog definition file includes a catalog header information portion. The catalog header portion includes data or information representative of items such as the catalog definition file name and the desired hash algorithm or function for creating the catalog file. The catalog definition file also includes a catalog file information portion that includes a file identifier (e.g., file name and/or location) for each of the files in the first file system 102. In at least some instances, the catalog definition file for the first file system 102 is in the form of a text file having a format defined by the input requirements of the catalog generation utility.

At 306, using the catalog definition file created at 304, the bit-level file comparator 120 generates a first catalog file 201 for the first file system 102 using a catalog generation utility such as MakeCat. The first catalog file 201 includes a number of unique file identifiers 203, each associated with a file 104 included in the first file system 102. Using the hashing function (e.g., SHA1) specified in the catalog header information portion of the catalog definition file provided at 304, the catalog generation utility generates a respective hash value 205 that is logically associated with a respective file identifier 203 that corresponds to a file 104 included in the first filing system 102. Thus, each file 104a-104n included in the first file system 102 is represented in the first catalog file 201 by a corresponding file identifier 203a-203n and a logically associated corresponding hash value 205a-205n.

At 308, using each of the catalog definition file created at 304, the bit-level file comparator 120 generates a respective second catalog file 202 for each of the number of second file system(s) 112 using the catalog generation utility. Each second catalog file 202 includes file identifiers 204 corresponding to the files 114 included in each respective second file system 112. Using the hashing function (e.g., SHA1) specified in the catalog header information portion of the catalog definition file provided at 304, the catalog generation utility generates a respective hash value 206 that is logically associated with a respective identifier 204 that corresponds to a file 114 in one of the number of second file system(s) 112. Thus, each file 114a-114n included in each of the number of second file system(s) 112 is represented in each respective second catalog file 202 by a corresponding file identifier 204a-204n and a logically associated corresponding hash value 206a-206n.

At 310, the bit-level comparator system 120 compares the hash value (e.g., hash value 205a) logically associated with a file identifier (e.g., file identifier 203a) representing a file (e.g., file 104a) found in the first catalog file 201 to the hash value (e.g., hash value 206a) logically associated with the corresponding file identifier (e.g., file identifier 204a) representing a file (e.g., file 114a) found in the each of the respective second catalog file(s) 202.

In some instances, the bit-level comparator system 120 performs a catalog-by-catalog comparison of hash values. In such instances, the bit-level comparator system 120 compares the hash values 205a-205n logically associated with each of the file identifiers 203a-203n included in the first catalog file 201 with the hash values 206a-206n logically associated with each of the corresponding file identifiers 204a-204n included in a particular one of the number of second catalog file(s) 202 before proceeding to compare the hash values 205a-205n with the hash values 206a-206n logically associated with file identifiers 204a-204n in a succeeding one of the number of second catalog file(s) 202.

In some instances, the bit-level comparator system 120 performs a file-by-file comparison of hash values. In such instances, the bit-level comparator system 120 compares the hash value 205 (e.g., hash value 205a) logically associated with a file identifier 203 (e.g., file identifier 203a) included in the first catalog file 201 with the corresponding file identifiers 204 (e.g., file identifier 204a) included in each of the number of second catalog file(s) 202 before proceeding to compare the subsequent hash value 205 (e.g., hash value 205b) logically associated with a file identifier 203 (e.g., file identifier 203b) included in the first catalog file 201 with the corresponding hash value 206 (e.g., hash value 206b) logically associated with the corresponding file identifier 204 (e.g., file identifier 204b) included in each of the number of second catalog file(s) 202.

At 312, the bit-level comparator system 120 determines whether the hash values 205a-205n logically associated with the respective file identifiers 203a-203n included in the first catalog file 201 are identical to the hash values 206a-206n logically associated with the respective, corresponding, file identifiers 204a-204n included in each of the number of second catalog file(s) 202. The existence of identical hash values for corresponding file identifiers indicates the original files 104, 114 represented by the file identifiers 203, 204 logically associated with the respective hash values 205, 206 are identical in content at the bit level (i.e., a change of one bit in either of the files 104, 144 would yield non-identical hash values 205, 206—thus, matching hash values 205, 206 are indicative of a similarity between the files 104, 114 at the bit level).

At 314, if the bit-level comparator system 120 determined the hash values 205a-205n logically associated with the respective file identifiers 203a-203n in the first catalog file 201 were identical to the hash values 206a-206n logically associated with the respective file identifiers 204a-204n in each of the number of second catalog file(s) 202 at 314, the bit-level comparator system 120 generates one or more user perceptible outputs. In some instances, the one or more user perceptible outputs may provide an indication of the identical hash values 205a-205n and 206a-206n.

At 316, if the bit-level comparator system 120 determined the hash values 205a-205n logically associated with the respective file identifiers 203a-203n in the first catalog file 201 were not identical to the hash values 206a-206n logically associated with the respective file identifiers 204a-204n in each of the number of second catalog file(s) 202 at 314, the bit-level comparator system 120 generates one or more user perceptible outputs. In some instances, the one or more user perceptible outputs may provide an indication of the existence of one or more non-identical hash values 205a-205n and 206a-206n included in the first file system 102 and one or more second file systems 112, respectively.

At 318, the bit-level comparator system 120 generates a user perceptible output of the specific files 104, 114 for which the respective hash values 205, 206 do not match. The bit level file comparator method 300 concludes at 322.

Figure 4:
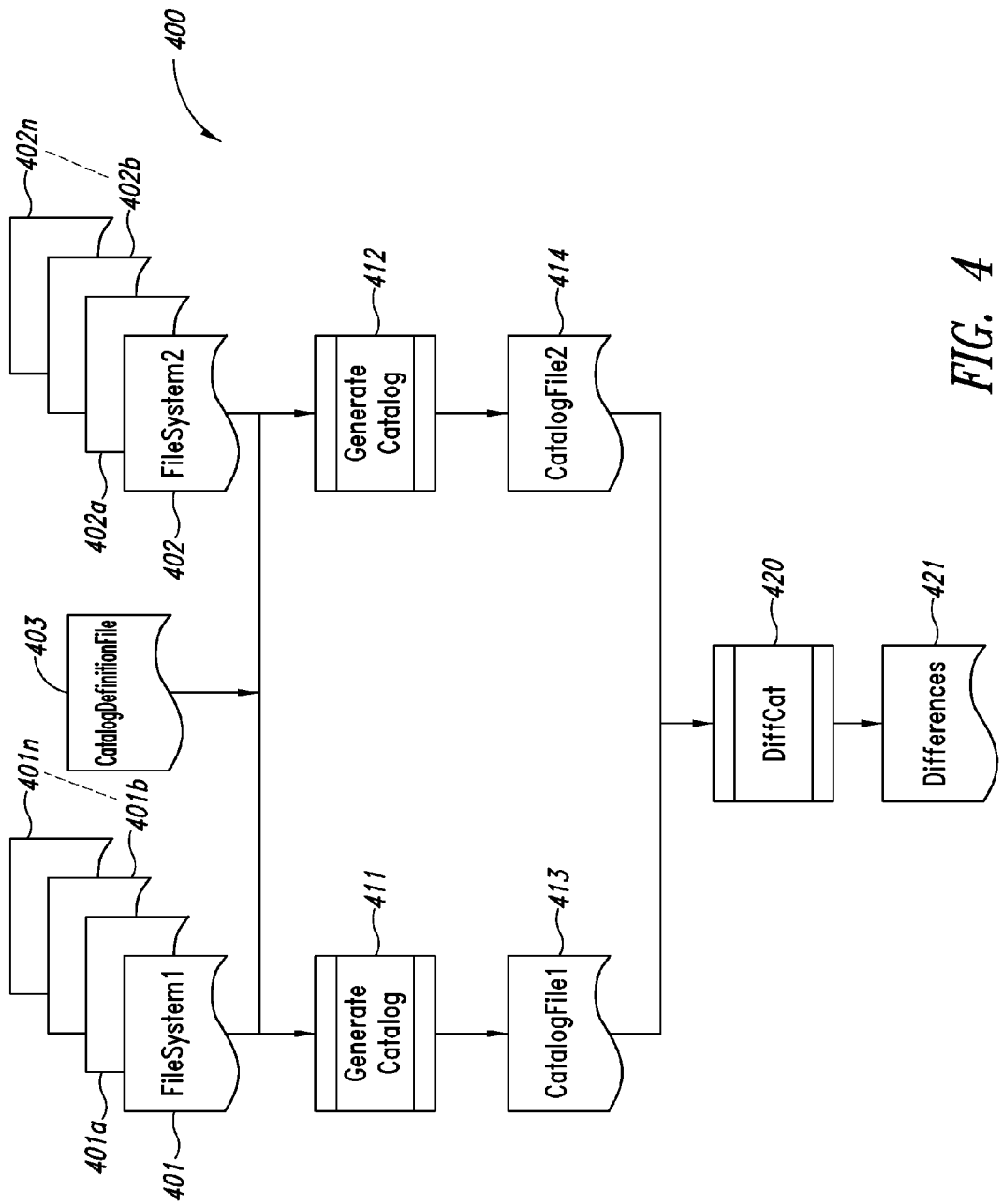
FIG. 4 is a high-level logic flow diagram of an illustrative method of comparing at a bit-level any number of machine-readable digital files in a first file system with any number of corresponding machine-readable digital files in any number of second file systems using a bit-level file comparator such as that in FIGS. 1 and 2, according to one illustrated embodiment.

FIG. 4 shows a high level flow diagram 400 of a bit-level comparator system 120 such as the illustrative system depicted in FIGS. 1 and 2. A first file system 401 that includes any number of individual files 401a-401n is compared at a bit level with a corresponding number of individual files 402a-402n included in one or more second file system(s) 402. The individual files 401a-401n and 402a-402n can include any file size, type, or structure. Some or all of the individual files 401a-401n and 402a-402n may be encrypted or otherwise algorithmically protected.

The bit-level comparator system 120 generates a catalog definition file that includes a catalog header information portion that includes data or information representative of items such as a preferred first catalog file name and a preferred hashing function. The catalog definition file also includes a file listing portion that that includes file identifier and/or location information for each file 401a-401 n included in the first file system 401. In at least some instances, the bit-level comparator system 120 autonomously generates the catalog definition file. In some instances, the bit-level comparator system 120 may prompt the system user to enter or input catalog file name and hashing function data for inclusion in the catalog header information portion of the catalog file generated using the catalog definition file. The bit-level comparator system 120 generates the catalog definition files for the first file system 401 and each of the number of second file system(s) 402 is a precursor to generating a catalog file for the first file system and each of the number of second file system(s) 402 using a catalog generation utility such as MakeCat. After identifying and eliminating any duplicate file identifiers in the catalog definition file, the bit-level comparator system 120 executes the catalog generation utility 411 to produce a first catalog file 413 for the first file system 401. The bit-level comparator system 120 executes the catalog generation utility 412 on each of the number of second catalog definition files to produce a respective second catalog file 414 for the respective second catalog definition file.

Using a DiffCat (i.e., a bit level file comparison) tool 420, the bit-level comparator system 120 compares the hash values 205 logically associated with the file identifiers 203 included in the first catalog file 413 with the hash values 206 logically associated with the file identifiers 204 included in each of the number of second catalog file(s) 414. In some instances, the comparison of hash values between the first catalog file 413 and each of the second catalog files 414 is performed on a catalog-by-catalog basis (i.e., all of the hash values in the first catalog file 413 are compared to all of the hash values in one of the number of second catalog files 414 prior to comparing the hash values to the next second catalog file 414). In some instances, the comparison of hash values between the first catalog file 413 and each of the second catalog files 414 is performed on a file-by-file basis (i.e., the hash value 205 logically associated with a particular file identifier 203 in the first catalog file 413 is compared to the hash value 206 logically associated with the corresponding file identifier 204 in each of the number of second catalog files 414 prior to comparing the hash value of the next file).

The bit-level comparator system 120 generates a system user perceptible output that, in some instances, includes a listing of files 104 in the first file system 401 for which differences 421 exist between the hash value associated with the file and the hash value(s) associated with the corresponding file 114 in one or more of the number of second file system(s) 402. A difference in the hash value 205n logically associated with a file identifier 203n associated with a file 104n in the first file system 401 and the hash value 206n logically associated with a file identifier 204n associated with the corresponding file 114n in a second file system 402 indicates a change as small as a single bit exists between the files 104n and 114n and that the files do not contain identical content at a bit level.

Figure 5:
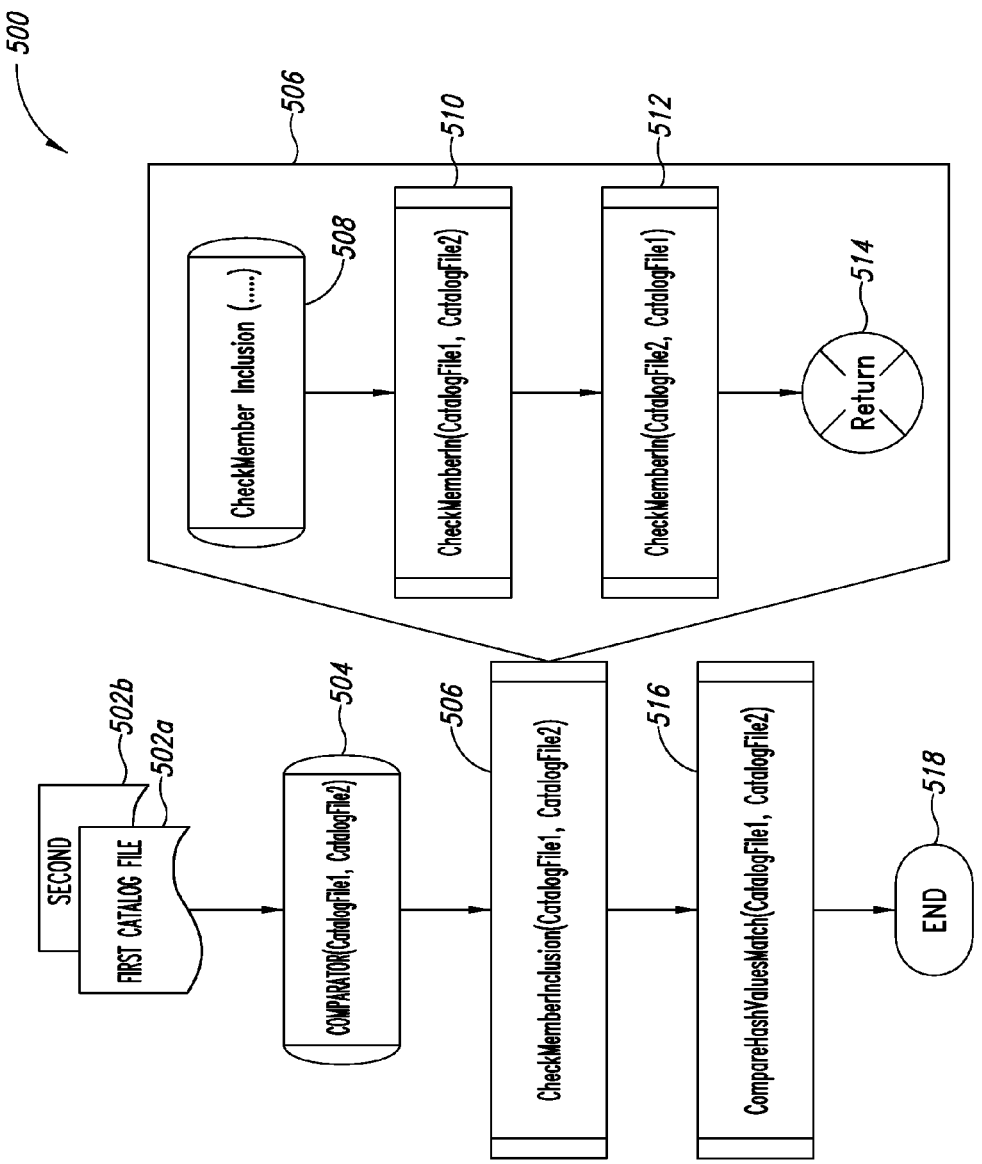
FIG. 5 is a high-level flow diagram of an illustrative bit level comparator capable of comparing at a bit-level any number of machine-readable digital files in a first file system with any number of corresponding machine-readable digital files in any number of second file systems using a bit-level file comparator such as that in FIGS. 1 and 2, according to one illustrated embodiment.

FIG. 5 shows a high level flow diagram 500 of a bit-level comparator system such as the illustrative bit-level comparator system 120 depicted in FIGS. 1 and 2. A number of catalog files (two depicted in FIG. 5, first catalog file 502a and second catalog file 502b, collectively "catalog files 502") are provided to a comparator module 504. Each of the catalog files 502 includes number of file identifiers, each having a logically associated hash value. Each of the file identifiers represent a respective file included in a machine- or processor-readable file system. The hash value logically associated with each file identifier is generated by applying a hash function to the file associated with the respective file identifier.

In order to determine whether two file systems are identical at the bit-level, the bit-level comparator system 120 compares the hash value logically associated with a file identifier in a first catalog file 502a with the hash value logically associated with the corresponding file identifier in second catalog file 502b. Identical hash values indicate the machine- or processor-readable file associated with each of the compared file identifiers are identical at the bit level. Non-identical hash values indicate the machine- or processor-readable file associated with each of the compared file identifiers are not identical at the bit level.

In some instances, prior to comparing hash values, the bit-level comparator system 120 uses a check member inclusion sub-system 506 to detect the existence of a symmetric difference between the contents of the two catalog files 502a and 502b. The symmetric difference of a first catalog file (i.e., catalog file 502a) and a second catalog file (i.e., catalog file 502b) is the set of file identifiers that appear in either of the catalog files but do not appear in both of the catalog files. For example, if the first catalog file 502a contained file identifiers "1000," "1001," "1002," and "1003" and the second catalog file 502b contained file identifiers "1001," "1002," "1003," and "1004", comparing the first catalog file to the second catalog file would identify file identifier "1000" as included in the first catalog file but not in the second catalog file. Comparing the second catalog file to the file catalog file would identify file identifier "1004" as included in the second catalog file but not in the first catalog file. The symmetric difference would be the set of file identifiers "1000" and "1004." Since catalog files 502 containing dissimilar sets of file identifiers cannot be considered identical, such a preliminary comparison module advantageously identifies such prima facie dissimilar catalog files 502 without performing a bit-level comparison.

At 506 the first catalog file 502a and the second catalog file 502b are transmitted, communicated, or otherwise passed to a check member inclusion sub-system 508. The data received by the check member inclusion sub-system 508 includes at least the set of file identifiers included in each of the catalog files 502a and 502b.

At 510, the check member inclusion sub-system 508 determines the symmetric difference by comparing the set of file identifiers included in the first catalog file 502a with the set of file identifiers included in the second catalog file 502b. Such a comparison identifies those file identifiers present in the first catalog file 502a that are not present in the second catalog file 502b. In the example provided above, the result would be file identifier 1000, which appears in the first catalog file 502a, but does not appear in the second catalog file 502b.

At 512, the check member inclusion sub-system 508 determines the symmetric difference by comparing the set of file identifiers included in second catalog file 502b with the set of file identifiers included in first catalog file 502a. Such a comparison identifies those file identifiers that are present in the second catalog file 502b that are not present in the first catalog file 502a. In the example provided above, the result would be file identifier 1004, which appears in the second catalog file 502b, but does not appear in the first catalog file 502a. The symmetric difference therefore provides a mechanism for detecting files in one catalog file not having a corresponding counterpart file identifier in another catalog file.

If the file identifiers included in the first catalog file 502a are not identical to the file identifiers included in the second catalog file 502b and the file identifiers included in the second catalog file 502b are not identical to the file identifiers included in the first catalog file 502a (i.e., a symmetric difference exists between the catalog files), the check member inclusion sub-system 508 reports an error prior to returning control to the bit-level comparator system at 514.

If the file identifiers included in the first catalog file 502a are identical to the file identifiers included in the second catalog file 502b and the file identifiers included in the second catalog file 502b are identical to the file identifiers included in the first catalog file 502a (i.e., a symmetric difference does not exist between the catalog files), the check member inclusion sub-system 508 returns control to the bit-level comparator system at 514.

At 516, the compare hash values system 516 compares the respective hash value logically associated with each of the file identifiers included in a first catalog file with the respective hash value logically associated with the corresponding file identifier included in a second catalog file. In some implementations, the compare hash values system 516 can compare the respective hash value logically associated with each of the file identifiers in a first catalog file with the respective hash value logically associated with the corresponding file identifiers in any number of additional catalog files (e.g., second catalog file, third catalog file, fourth catalog file, and so on). The comparator module terminates at 518.

FIG. 6 shows a screen capture 600 of an illustrative command line implementation of the bit-level file comparator. While the bit-level comparator system 120 may be implemented in a graphical user environment (e.g., as a graphical user interface or 'GUI'), in some implementations, the file comparator is executable from a command line as shown in FIG. 6. The command line syntax is provided at 602: DiffCat CATfile1 CATfile2. "CATfile1" is the location (e.g., directory path) and file name of the first catalog file 201. "CATfile2" is the location (e.g., directory path) and file name of the second catalog file 202. Recall, the file names for the each of the catalog files are provided as catalog header information in the catalog definition file (.cdf) used to create the catalog file.

Command line 604 provides an example bit-level comparator executable command. Command line 604 calls the bit-level comparator named "diffcat" which compares the contents of the catalog file "Demo.cat" 604 found in directory "FS1" with the contents of the catalog file "Demo.cat" 608 found in directory "FS2." While the bit-level comparator executes, the command line may display one or more comments 610 indicating that the bit-comparator is executing.

FIG. 7A shows a screen capture 700 of a first text file 701 in a first file system 102 and a second text file 702 in a second file system 112. Note the contents of the first text file 701 and the second text file 702 are nearly identical including the universal resource locator 703 ("URL"—www.codeplex.com/json/) in both the first text file 701 and the second text file 702. However in the first text file 701 the URL prefix ("http://") 704 indicates a standard hypertext transport protocol message format while in the second text file 702, the URL prefix ("https://") 705 indicates a secure hypertext transport protocol message. Thus, the only difference between the first text file 701 and the second text file 702 is the presence of the "s" in the prefix of a single URL in the second text file 702.

FIG. 7B shows a screen capture 710 of an illustrative command line implementation of a bit-level comparator used to compare the first text file 701 to the second text file 702. The command line 718 compares the catalog file "Demo.cat" 720 that includes the first text file 701 with the catalog file "Demo.cat" 722 that includes the second text file 702. During the bit level comparison process, the bit-level comparator displays an informational message 724 indicating the comparison is in progress.

When the bit-level comparator 120 compares the hash value 728 logically associated with the first file 701 to the hash value 730 logically associated with the second file 702, the presence of the "s" in the hypertext transport protocol prefix in the second file 702 creates a completely different hash value 730 that the hash value 728 logically associated with the first file 701. In some instances, upon detecting the difference between the hash tag 728 logically associated with the first file 701 and the hash tag 730 logically associated with the second file 702, the bit-level comparator 120 can generate a notification that includes the file name and the hash tags associated with the file name.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other environments, not necessarily the exemplary commercial environment generally described above.

Also for instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of physical signal bearing media used to actually carry out the distribution. Examples of physical signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to compare a first file system including a number of machine readable digital files having a 1:1 correspondence with a number of machine readable digital files included in each of a number of second file systems to detect bit-level differences between each of the number of machine readable digital files in the first file system and the corresponding machine readable digital file in some or all of the number of second file systems, the method comprising:

creating by at least one processor a catalog definition file that includes a number of file identifiers, each file identifier corresponding to and associated with one of a number of machine-readable digital files included in the first file system;

generating by the at least one processor via the catalog definition file a first catalog file containing a number of hash values, each of the number of hash values logically associated with a respective one of the number of file identifiers included in the catalog definition file;

storing data indicative of the first catalog file in at least one communicably coupled nontransitory storage medium by the at least one processor;

generating via the catalog definition file a respective second catalog file for each of the number of second file systems, each second catalog file including a number of hash values, each of the hash values logically associated with a respective one of the file identifiers included in the respective second catalog file;

storing each of the second catalog files in the at least one communicably coupled nontransitory storage medium by the at least one processor;

determining a symmetric difference between at least a portion of the data included in the first catalog file and the corresponding portion of the data included in the second catalog file;

determining whether the symmetric difference is a non-zero value;

responsive to determining that the symmetric difference is a non-zero value, generating an alert output; and determining by the at least one processor whether each machine-readable digital file included in the first file system is identical at a bit level with a corresponding machine-readable digital file included in each of the number of second file systems by comparing on a file-by-file basis, the hash value associated with each of the number of file identifiers included in the stored first catalog file with the hash value logically associated with the corresponding one of the number of file identifiers included in each of the number of stored second catalog files.

2. The method of claim 1, further comprising:
inserting catalog header information into the catalog definition file.

3. The method of claim 1 wherein generating by the at least one processor via the catalog definition file, a first catalog file containing a number of hash values includes: generating a first catalog file containing a number of hash values determined using an SHA1 hashing function; and
wherein generating by the at least one processor via the catalog definition file a respective second catalog file for each of the number of second file systems, each second catalog file containing a number of hash values includes: generating a number of second catalog files, each of the number of second catalog files containing a number of hash values determined using an SHA1 hashing function.

4. The method of claim 1, further comprising:
for each instance where the hash value logically associated with one of the file identifiers included in the first catalog file does not match the hash value logically associated with the corresponding file identifier in some or all of the number of second catalog files, generating by the at least one processor an alert that includes data indicative of the identity of each file identifier for which the hash values do not match.

5. The method of claim 4 wherein generating an alert that includes data indicative of the identity of each file identifier for which the hash values do not match, further comprises:
generating by the at least one processor an alert that includes data indicative of: the respective file identifier, the hash value logically associated with the respective file identifier included in the first catalog file and the hash value logically associated with the respective file identifier included in the second catalog file.

6. The method of claim 4 further comprising:
for each instance where the hash value logically associated with a file identifier included in the first catalog file does not match the hash value logically associated with the corresponding file identifier in some or all of the number of second catalog files, generating by the at least one processor an alert that includes data indicative of the identity of the one or more second catalog files including the respective non-matching hash value.

7. The method of claim 6 wherein generating an alert that includes data indicative of the identity of each of the one or more second catalog files for which the hash values do not match, further comprises:
generating by the at least one processor an alert that includes data indicative of: the machine-readable digital file name associated with the respective file identifier and the hash value logically associated with the respective file identifier included in the first catalog file; and, the machine-readable digital file name associated with the respective file identifier and the hash value logically associated with the respective file identifier in the respective second directory.

8. A nontransitory, computer readable media containing machine readable, processor executable, instructions that when executed by at least one processor, cause the at least one processor to function as a bit-level file comparator by:
creating a catalog definition file that includes a number of file identifiers, each file identifier corresponding to and associated with a machine-readable digital file included in a first file system;

generating via the catalog definition file a first catalog file containing a number of hash values, each of the number of hash values logically associated with a respective one of the number of file identifiers included in the catalog definition file;

storing the first catalog in at least one communicably coupled, nontransitory storage medium;

generating via the catalog definition file a respective second catalog file for each of a number of second file systems, each second catalog file including a number of hash values, each of the hash values logically associated with a respective one of a number of file identifiers included in the respective second catalog file;

storing each of the number of second catalogs in the at least one communicably coupled, nontransitory storage medium;

determining a symmetric difference between at least a portion of the data included in the first catalog file and the corresponding portion of the data included in the second catalog file;

determining whether the symmetric difference is a non-zero value;

responsive to determining that the symmetric difference is a non-zero value, generating an alert output; and determining whether each machine-readable digital file included in the first file system is identical at a bit level with a corresponding machine-readable digital file included in each of the number of second file systems by comparing on a file-by-file basis, the hash value logically associated with each of the number of file identifiers included in the stored first catalog file with the hash value logically associated with the corresponding one of the number of file identifiers included in each of the number of stored second catalog files.

9. The nontransitory, computer readable media of claim 8, further comprising machine readable, processor executable, instructions that when executed by at least one processor, further cause the at least one processor to function as a bit-level file comparator by:
　inserting catalog header information into the catalog definition file.

10. The nontransitory, computer readable media of claim 8 wherein generating via the catalog definition file a first catalog file containing a number of hash values, includes: generating a first catalog file containing a number of hash values determined using an SHA1 hashing function; and
　wherein generating via the catalog definition file a respective second catalog file for each of the number of second file systems, each second catalog file containing a number of hash values, includes: generating a number of second catalog files, each of the number of second catalog files containing a number of hash values determined using an SHA1 hashing function.

11. The nontransitory, computer readable media of claim 8, further comprising machine readable, processor executable, instructions that cause the at least one processor to function as a bit-level file comparator by:
　for each instance where the hash value logically associated with one of the file identifiers included in the first catalog file does not match the hash value logically associated with the corresponding file identifier in some or all of the number of second catalog files, generating an alert that includes data indicative of the identity of each file identifier for which the hash values do not match.

12. The nontransitory, computer readable media of claim 11 wherein the machine readable, processor executable, instructions that cause the at least one processor to function as a bit-level file comparator by generating an alert that includes data indicative of the identity of each file identifier for which the hash values do not match, further cause the at least one processor to function as a bit-level file comparator by:
　generating an alert that includes data indicative of: the respective file identifier, the hash value logically associated with the respective file identifier included in the first catalog file and the hash value logically associated with the respective file identifier included in the second catalog file.

13. The nontransitory, computer readable media of claim 11, further comprising machine readable, processor executable, instructions that cause the at least one processor to function as a bit-level file comparator by:
　for each instance where the hash value logically associated with a file identifier included in the first catalog file does not match the hash value logically associated with the corresponding file identifier in some or all of the number of second catalog files, generating an alert that includes data indicative of the identity of the one or more second catalog files including the respective non-matching hash value.

14. The nontransitory, computer readable media of claim 13 wherein the machine readable, processor executable, instructions that cause the at least one processor to function as a bit-level file comparator by generating an alert that includes data indicative of the identity of the one or more second catalog files for which the logically associated hash values do not match, further cause the at least one processor to function as a bit-level file comparator by:
　generating an alert that includes data indicative of: the machine-readable digital file name associated with the respective file identifier and the hash value logically associated with the respective file identifier included in the first catalog file; and, the machine-readable digital file name associated with the respective file identifier and the hash value logically associated with the respective file identifier in the respective second catalog file.

15. A file comparator system to compare a first file system including a number of machine readable digital files having a 1:1 correspondence with a number of machine readable digital files included in each of a number of second file systems to detect bit-level differences between each of the number of machine readable digital files in the first file system and the respective machine readable digital file in each of the number of second file systems, the system comprising:
　at least one nontransitory storage medium that, when in operation, stores data indicative of the number of machine readable digital files included in the first file system and data indicative of the number of machine readable digital files included in each of the number of second file systems;
　at least one processor communicably coupled to the at least one nontransitory storage medium; and
　at least one set of machine readable, processor executable, instructions included in the at least one nontransitory storage medium, that when executed by the at least one processor cause the at least one processor to:
　create a catalog definition file that includes a number of file identifiers, each file identifier corresponding to and associated with one of a number of machine readable digital files included in the first file system;
　generate via the catalog definition file a first catalog file containing a number of hash values, each of the number of hash values logically associated with a respective one of the number of file identifiers included in the catalog definition file;
　store the first catalog in the at least one nontransitory storage medium;
　generate via the catalog definition file a respective second catalog file for each of the number of second file systems, each second catalog file including a number of hash values, each of the hash values logically associated with a respective one of the number of file identifiers included in the respective second catalog file;
　store each of the number of second catalog files in the at least one nontransitory storage medium;
　determine a symmetric difference between at least a portion of the data included in the first catalog file and the corresponding portion of the data included in the second catalog file;
　determine whether the symmetric difference is a non-zero value;
　responsive to a determination that the symmetric difference is a non-zero value, generate an alert output; and
　determine whether each machine-readable digital file included in the first file system is identical at a bit level with a corresponding machine-readable digital file included in each of the number of second file systems by comparing on a file-by-file basis, the hash value associated with each of the number of file identifiers included in the stored first catalog file with the hash value logically associated with the corresponding one of the number of file identifiers included in each of the number of stored second catalog files.

16. The file comparator system of claim 15 wherein the one or more sets of machine readable, processor executable instructions cause the at least one processor to further:

insert catalog header information into the catalog definition file.

17. The file comparator system of claim 15 wherein the one or more sets of machine readable, processor executable instructions that cause the at least one processor to generate via the catalog definition file a first catalog file containing a number of hash values, cause the at least one processor to further:
generate a first catalog file containing a number of hash values determined using an SHA1 hashing function; and
wherein the one or more sets of machine readable, processor executable instructions that cause the at least one processor to generate via the catalog definition file, a respective second catalog file for each of the number of second file systems, each second catalog file including a number of hash values further cause the at least one processor to:
generate a number of second catalog files, each of the number of second catalog files containing a number of hash values determined using an SHA1 hashing function.

18. The file comparator system of claim 15 wherein the one or more sets of machine readable, processor executable instructions cause the at least one processor to further:
for each instance where the hash value logically associated with one of the file identifiers included in the first catalog file does not match the hash value logically associated with the corresponding file identifier in some or all of the number of second catalog files, generate an alert that includes data indicative of the identity of each file identifier for which the hash values do not match.

19. The file comparator system of claim 18 wherein the one or more sets of machine readable, processor executable instructions that cause the at least one processor to generate an alert that includes data indicative of the identity of each file identifier for which the hash values do not match, cause the at least one processor to further:
generate an alert that includes data indicative of: the respective file identifier, the hash value logically associated with the respective file identifier included in the first catalog file, and the hash value logically associated with the respective file identifier included in the second catalog file.

20. The file comparator system of claim 18 wherein the one or more sets of machine readable, processor executable instructions further cause the at least one processor to:
for each instance where the hash value logically associated with the file identifier included in the first catalog file does not match the hash value logically associated with the corresponding file identifier in some or all of the number of second catalog files, generate an alert that includes data indicative of the identity of the one or more second catalog files including the respective non-matching hash value.

21. The file comparator system of claim 20 wherein the one or more sets of machine readable, processor executable instructions that cause the at least one processor to generate an alert that includes data indicative of the identity of the one or more second catalog files for which the hash values do not match, cause the at least one processor to further:
generate an alert that includes data indicative of: the machine-readable digital file name associated with the respective file identifier and the hash value logically associated with the respective file identifier included in the first catalog file; and, the machine-readable digital file name associated with the respective file identifier and the hash value logically associated with the respective file identifier in the respective second catalog file.

* * * * *